No. 663,951. Patented Dec. 18, 1900.
A. H. ARMSTRONG.
SYSTEM OF MOTOR CONTROL.
(Application filed Oct. 6, 1900.)
(No Model.) 3 Sheets—Sheet 1.
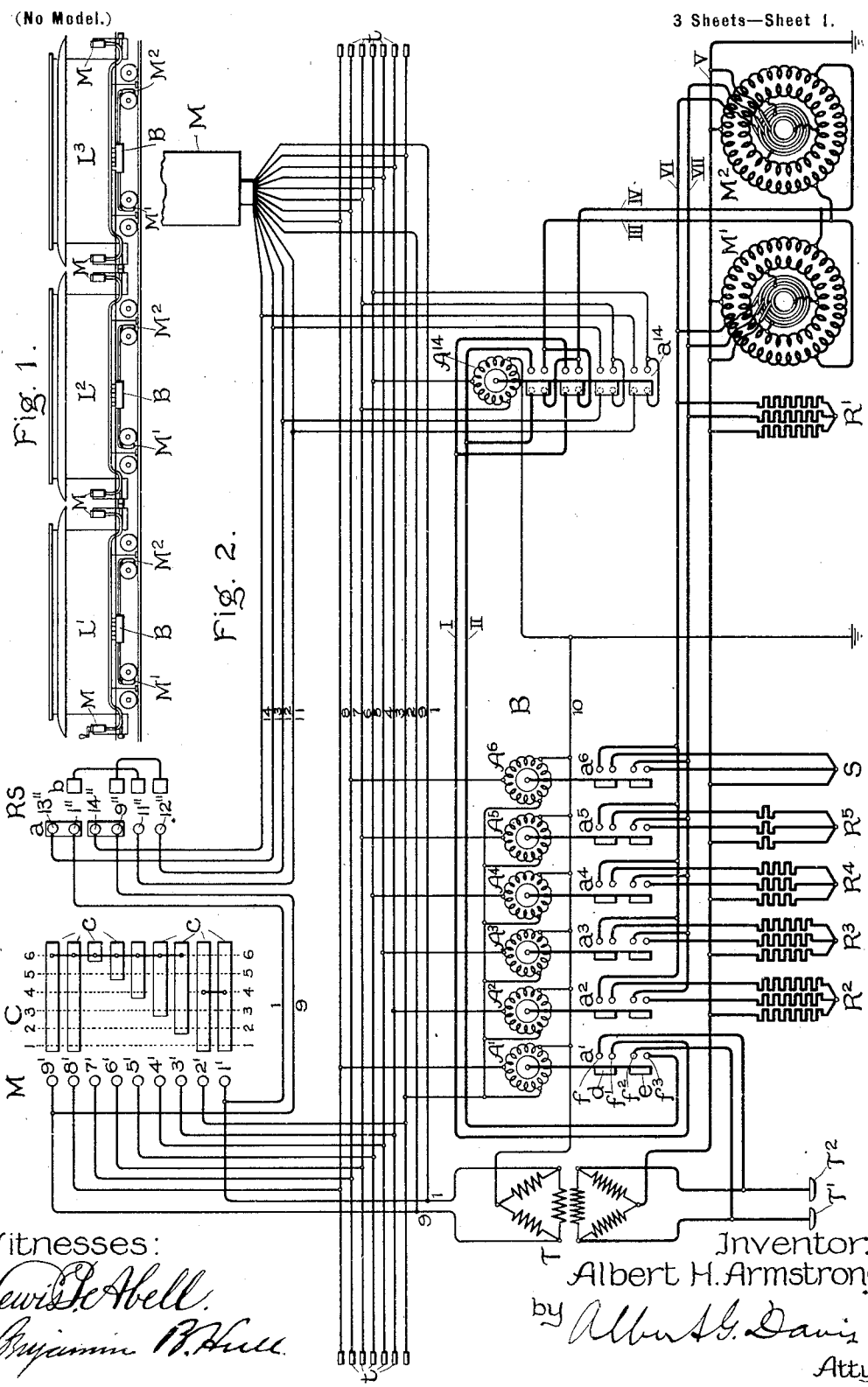
Witnesses:
Lewis P. Abell.
Benjamin B. Hull.
Inventor:
Albert H. Armstrong
by Albert G. Davis
Atty.

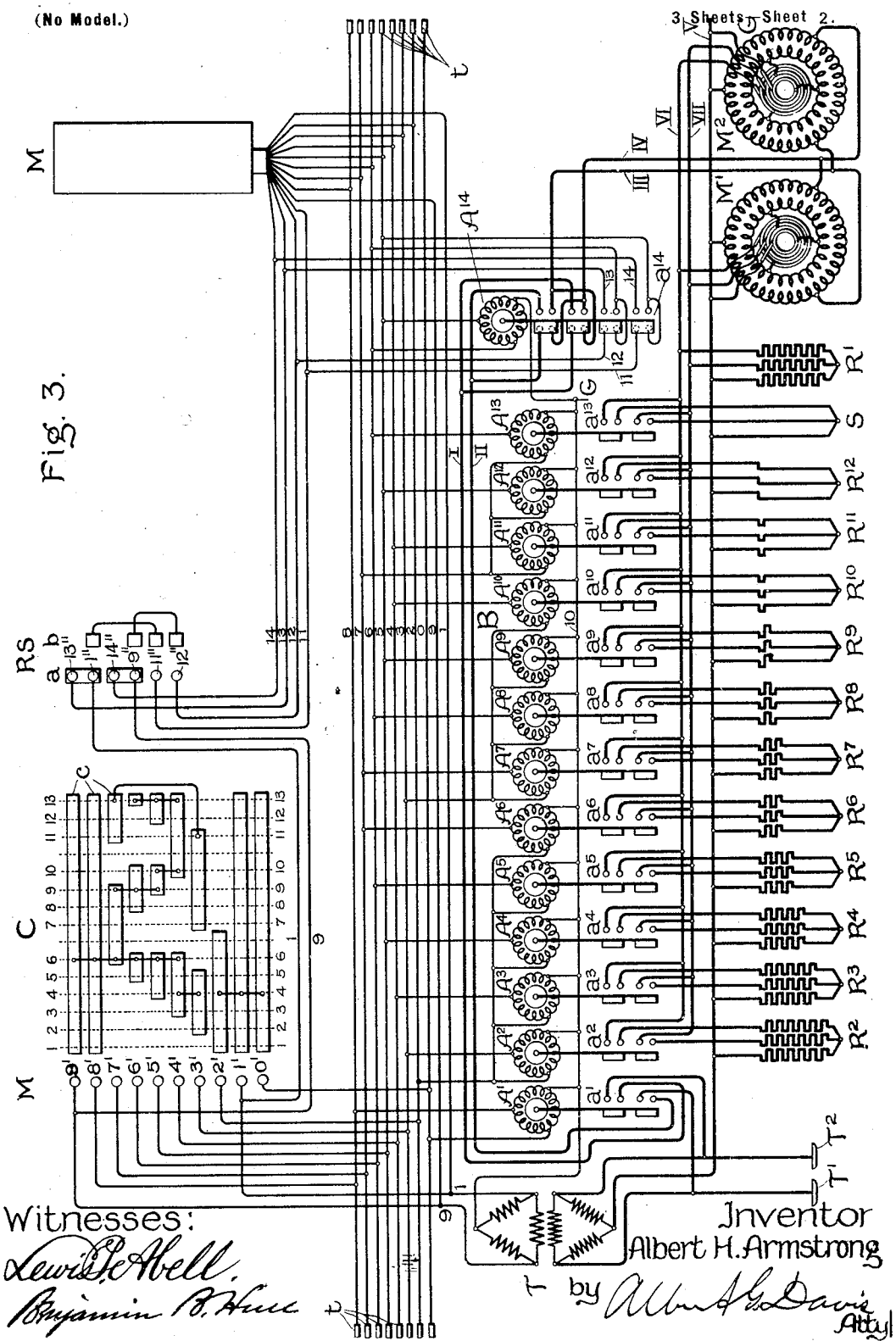

No. 663,951. Patented Dec. 18, 1900.
A. H. ARMSTRONG.
SYSTEM OF MOTOR CONTROL.
(Application filed Oct. 6, 1900.)
(No Model.) 3 Sheets—Sheet 3.
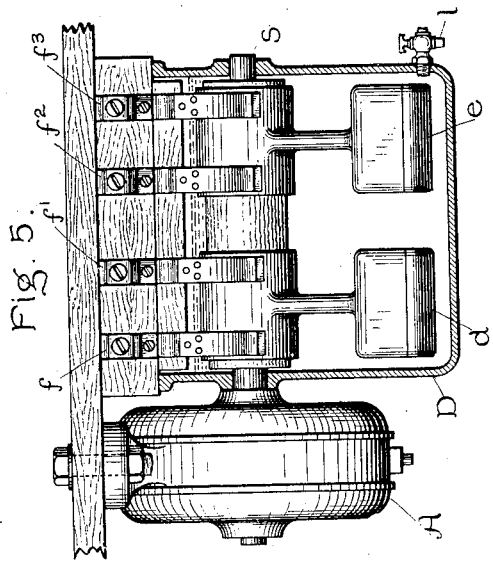
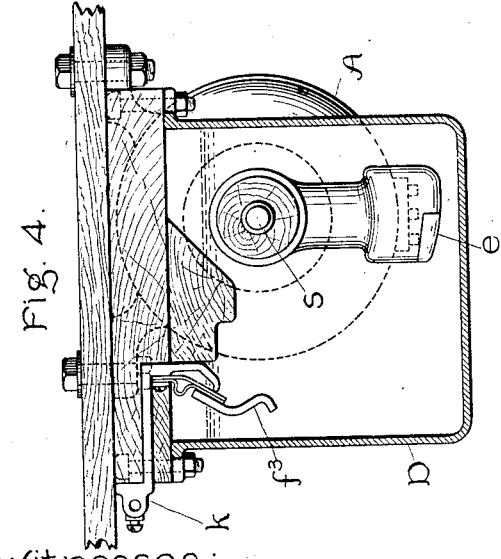
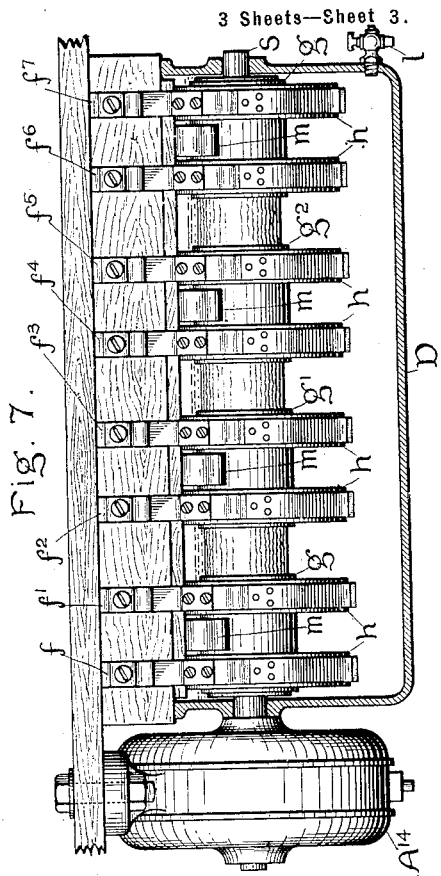
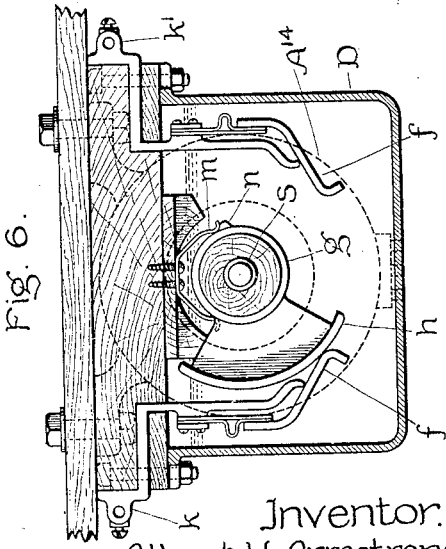
Witnesses:
Lewis P. Abell.
Benjamin B. Hull.
Inventor:
Albert H. Armstrong
by Albert G. Davis
Atty.

UNITED STATES PATENT OFFICE.

ALBERT H. ARMSTRONG, OF SCHENECTADY, NEW YORK, ASSIGNOR TO THE GENERAL ELECTRIC COMPANY, OF NEW YORK.

SYSTEM OF MOTOR CONTROL.

SPECIFICATION forming part of Letters Patent No. 663,951, dated December 18, 1900.

Application filed October 6, 1900. Serial No. 32,258. (No model.)

*To all whom it may concern:*

Be it known that I, ALBERT H. ARMSTRONG, a citizen of the United States, residing at Schenectady, county of Schenectady, State of New York, have invented certain new and useful Improvements in Systems of Motor Control, (Case No. 1,758,) of which the following is a specification.

My invention relates to a system of motor control, and has for its main object to provide a system for the individual control of a plurality of induction-motor equipments operated from an alternating-current source. It is not, however, limited to an alternating-current system, since certain of its features are applicable as well in a direct-current system. Moreover, the entire system of control may be utilized, irrespective of the character of the source of supply for the motors, if some means is provided for supplying multiphase current to the actuating devices of the motor-controllers.

The system which I have devised is especially designed for a train-control system, and comprises the general features which characterize direct-current train-control systems—namely, motor-controllers on one or more motor-cars controlled from a master-controller located at any desired point on the train.

My invention will be understood by reference to the following description, taken in connection with the accompanying drawings, while its scope will be pointed out in the appended claims.

In the drawings, Figure 1 is a diagram showing a train of cars to which my invention may be applied. Fig. 2 is a diagram illustrating the apparatus and circuit connections for a single car of a train arranged according to my invention. Fig. 3 is a diagram illustrating a modification of the sytem shown in Fig. 2. Figs. 4 and 5 are end and side views, respectively, in partial cross-section of one of the elements of the motor-controllers diagrammatically illustrated in Figs. 2 and 3; and Figs. 6 and 7 are end and side views, respectively, of the reversing-switch shown in diagram in Figs. 2 and 3.

Referring first to Fig. 1, L', L², and L³ indicate three cars united to form a train. Each of the cars is provided at each end with a master-controller M, connected to a system of conductors extending from one end to the other of the train. Each car is also provided with a controller B, arranged to control the circuit connections of the motors M' and M². The actuating devices of all of the motor-controllers are operatively connected to the system of conductors to which the master-controllers are connected.

In Fig. 2 I have shown in diagram the circuit connections according to my invention for one of the cars shown in Fig. 1, it being of course understood that the train may comprise any desired number of cars, only a part of which need be provided with propelling-motors, and that the circuit connections about to be described are required only on those cars, which are provided with motors, the other cars of the train, unless they are mere trailers, being equipped with the system of train-conductors only or with train-conductors and master-controllers. In Fig. 2 the numerals 2 to 8, inclusive, represent a system of train-conductors, each of the said conductors being provided at each end with a terminal $t$, by means of which it may be connected to a corresponding conductor on the adjacent cars. At each end of this system of conductors is provided a master-controller M, the one at the right being shown in partial outline only, while the one at the left is shown with its contacts developed on a plane surface, as is customary in diagrammatically illustrating such structures. Each master-controller comprises a switch C for controlling the resistance connections of the propelling-motors and a switch R S for controlling the direction of flow of current through the windings of said motors.

The motor-controller is shown at B and comprises a plurality of contact devices $a'$ to $a^6$, inclusive, and $a^{14}$, the said contact devices being actuated by induction-motors A' to A⁶, inclusive, and A¹⁴, the rotating members of which are suitably connected to the contact devices and the fixed members of which are supplied with multiphase currents in a manner hereinafter to be described. The contact device $a'$ controls the connection between the primary circuits of the propelling-motors and the source and is maintained in its closed position as long as the switch C of the master-controller is in any one of its operative positions. The contact devices $a^2$ to $a^6$, inclusive, control, in the case of the particular type of propelling-motors shown, the resistance of the secondary circuits of the motors and are successively closed as the switch C of the master-controller is moved to its final position. Each of the contact devices $a'$ to $a^6$ comprises two sets of fixed terminals $f f'$ and $f^2 f^3$ and two movable contacts $d$ and $e$, arranged to be brought into engagement with said terminals, so as to complete circuits through the same.

The system which I have illustrated is designed to be operated from a three-phase source, the propelling-motors M' and M² being supplied with current through three circuits, two of which are connected to the trolley-shoes T' and T² and the other to a permanent ground connection which may be completed through the car-wheels and rails. Since in order to open-circuit a three-phase system it is only necessary to open the circuit of two of the three leads, I have provided switches only in those leads to which the trolley-shoes are connected, the terminals $f$ and $f'$ and the contact $d$ of the contact device $a'$ constituting the switch in the lead I and the terminals $f^2$ and $f^3$ and the contact $e$ of the same contact device constituting the switch in the lead II. The leads I and II are connected to the contacts of a reversing-switch $a^{14}$, operated by the induction-motor $A^{14}$, and from the reversing-switch conductors III and IV lead to two of the terminals of the propelling-motors, the third terminal being connected to ground through the conductor V. The reversing-switch $a^{14}$ is similar in its general construction to each of the devices $a'$ to $a^6$, save that it has two operative positions and therefore four sets of terminals in the motor-circuits instead of the two sets with which the main contact devices are provided. There are also four additional sets of terminals included in the operating-circuits between the reversing-switch-actuating motors and the master-controller, the function of which will be hereinafter described.

The secondary or induced windings of the propelling-motors are connected through collecting-rings to the conductors V, VI, and VII, between which the several sections of a resistance R' are permanently connected. Other resistances $R^2$, $R^3$, $R^4$, and $R^5$ are arranged to be connected in multiple with resistance R' as the contact devices of the motor-controller are actuated, and in the final position of the controller all the resistances in circuit with the induced windings are short-circuited by a connection S.

The actuating-motors of the motor-controllers are supplied with current from the main source preferably through a tension-reducing transformer T. This transformer has two of the terminals of its primary circuit connected to the trolley-shoes T and T', the third terminal being connected to ground. One of the secondary terminals is connected to ground through the conductor 10 in common with one of the terminals of each of the motors A' to $A^6$ and $A^{14}$, and the connections between the other secondary terminals and the other terminals of the controller-actuating motors are controlled through the switches of the master-controllers. These two terminals of the transformer secondary are connected by means of conductors 9 and 1 to the fixed contacts 9' and 1' of the switch C and to the fixed contacts 9'' and 1'' of the switch R S of the master-controller. The remaining fixed contacts of the switch C are connected each to a corresponding train-conductor, and the remaining fixed contacts of the switch R S are connected through conductors 11 to 14 to certain auxiliary terminals of the reversing-switch and through them (until the switch has been operated) to the train-conductors 5 and 6, to which two terminals of the reversing-switch-actuating motors $A^{14}$ are connected.

Supposing the parts to be in the positions illustrated in Fig. 2, the controlling-circuits will be open at the contacts of the switch C of the master-controller and the primary or inducing circuits of the propelling-motors will be open at the terminals of the contact device $a'$. If now the controlling-switch C of the master-controller is moved into its first operative position so as to bring the movable contacts $c$ into engagement with the fixed contacts 1', 2', 8', and 9', current from the secondary of the three-phase transformer will flow through the conductors 1, 9, and 10 as follows: from conductor 1 to the contact 1', thence by way of the cross-connected contacts $c$ to the contact 2' and conductor 2 of the train system, from conductor 9 to the contact 9', thence by way of cross-connected contacts $c$ to the contact 8' and conductor 8 of the train system, and from conductor 10 to the permanent ground connection. Since the three terminals of the motor A' on each of the cars of the train are connected to the train-conductors 2 and 8 and to the ground connection 10, the current supplied in the first position of the master-controller will actuate the rotatable member of the motors A' to close the contact devices $a'$ As soon as these contact devices are closed current will flow from the trolley-shoes T' and T² on each car through the contacts of the contact device $a'$ to the conductors I and II, and thence through the contacts of the reversing-switch to the conductors III and IV and to two of the terminals of the inducing windings of the motors M' M², the third terminal of each of these windings being connected to ground through the conductor V. The motors M' and M² will now start in operation, but will run at low speed, because of the fact that the large resistance R' is included in the circuit of their induced elements. It has already been stated that one terminal of each of the motors A' to $A^6$ is permanently connected to ground. It will further be noted that another terminal of each motor is connected to the train-conductor 2. As soon, therefore, as the switch C has been moved into its first operative position to actuate the motor A' current will be supplied from one of the windings of the three-phase-transformer secondary to a portion of the winding of each of the motors $A^2$ to $A^6$; but since this current is single phase the said motors will not be actuated. As soon, however, as the third terminal of each motor is connected to the third terminal of the transformer secondary it will be supplied with three-phase-currents, and will therefore be actuated to close the corresponding contact device. The third terminal of each of the motors is connected to one of the train-conductors 3 7, and these train-conductors as the master-controller is operated are successively connected to the conductor 9, leading to the third terminal of the transformer secondary. With the connections shown the current for actuating all the controller-motors is obtained from a single transformer, but the transformers on the several cars may be connected in multiple through conductors of the train system. When the main controlling-switch of the master-controller is moved into its second operative position, the circuit will be closed from the conductor 9 through the contacts 9' and 3' to the train-conductor 3, thus connecting the three terminals of the motors $A^2$ on each of the cars of the train to the secondary circuit of the transformer T and causing the said motors to be operated to close the contact device $A^2$ on each car. The closing of this device operates to connect resistance $R^2$ in multiple with the resistance $R'$, and therefore to reduce the value of the resistance in circuit with the induced members of the propelling-motors. In the third position of the master-controller the circuit connections already referred to will be maintained and in addition a new circuit will be closed from the conductor 9 through the contacts 9' and 4' to the conductor 4 of the train system. The motor $A^3$ will then be caused to actuate its contact device $a^3$ to further reduce the resistance in the circuit of the induced members of the propelling-motors by connecting in the resistance $R^3$. In the subsequent positions of the master-controller the remaining contact devices will be actuated and in the last position 6 6 the contact device $a^6$ will short-circuit all the resistances $R'$ to $R^5$, inclusive, thereby cutting out all the resistance in the induced circuits of the driving-motors. This is the running position of the controller.

The connections between the actuating-motors for the reversing-switches on the several cars and the master-controller reversing-switch are so arranged that the said reversing-switches may be actuated without increasing the number of train-conductors above that required to operate the resistance-contact devices of the controller. This arrangement is rendered possible by reason of the fact that the reversing-switch is operated only when the switch C is in its off position. The terminals of the motors $A^{14}$ on the several cars of the train are connected to the train-conductors 5 and 6, and these conductors are connected to the conductors 9 and 1 through auxiliary contact devices operated by that one of the motors $A^{14}$ which is on the same car with the master-controller from which the train is for the time being controlled. The reversing-switch motor on the car on which the master-controller is located opens the circuits between the conductors 9 and 1 and the train-conductors 5 and 6 as the reversing-switch is operated, and therefore leaves the said train-conductors after the reversing-switches have been operated entirely disconnected from the actuating-circuits. With the reversing-switch R S of the master-controller in the position shown in the drawings the contact device $a^{14}$ of the main reversing-switch will occupy the position shown, with its movable contacts engaging the fixed terminals on the left, so that the conductor I is connected through one of said contacts to the conductor IV and the conductor II through another of the contacts to the conductor III. If now the switch R S is moved so as to carry the movable contacts $a$ out of engagement with the fixed contacts and to bring the movable contacts $b$ into engagement with the same, circuits for the motors $A^{14}$ will be closed as follows: from conductor 9 to fixed contact 9" of the master-controller switch R S, thence through cross-connected contacts $b$ to the fixed contact 12", thence by way of conductor 12 through one of the auxiliary contacts of the contact device $a^{14}$ to conductor 6 of the train system, and thence to one of the terminals of each of the motors $A^{14}$, from conductor 1 to fixed contact 1" of the switch R S, thence through cross-connected contacts $b$ to contact 11", and thence by way of conductor 11 through another auxiliary contact of the contact device $a^{14}$ to train-conductor 5, to which another terminal of each of the motors $A^{14}$ is connected. The remaining terminal of each of the said motors is connected to the third secondary terminal of the transformer T through ground. When these circuits are completed, the motors $A^{14}$ will be actuated and will move the contacts of the contact device $a^{14}$ into engagement with the fixed contacts on the right. As soon as the auxiliary contacts on the master-controller car have been moved out of engagement with their corresponding terminals on the left the connections to the transformer secondary will be broken and the motors $A^{14}$ open-circuited. At the same time the said auxiliary contacts will come into engagement with the terminals on the right, connecting the said motor-terminals and train-conductors to the fixed contacts 13" and 14" of the switch R S, so that the reversing-switch motors may be actuated in the reverse direction, when the switch R S is again moved to bring the movable contacts $a$ into engagement with the corresponding fixed contacts.

Although two of the terminals of the motors $A^{14}$ are permanently connected to the train-conductors 5 and 6 and the third to ground, the said motors cannot be actuated by the main controlling-switch of the master-controller for the reason that the two conductors 5 and 6 are never connected to different terminals of the transformer secondary, but always to the same one. In certain positions of the main controlling-switch current will be supplied to the windings of the motors $A^{14}$, but it will be single-phase current instead of three phase.

In order to prevent the operation of the switch R S unless the switch C is in its off position, and vice versa, the usual mechanical interlocking devices will be provided. I prefer also to provide the switch C with an electromagnetic lock connected in circuit with the switch R S and operating to prevent movement of the switch C unless all the main reversing-switches on the train have been properly operated. Such an electromagnetic lock for use in train-control systems has been devised by F. E. Case.

The system above described provides but four resistance-steps for the motor controllers. In many installations it will be advisable to have a greater number of steps between the off and the running positions, and in Fig. 3 I have shown how by the addition of a single train-conductor to separate the circuits of the motor A' from the others a greatly-increased number of steps may be obtained. The system shown in Fig. 3 is in general the same as that of Fig. 2; but I have so modified the master-controller and so connected the additional actuating-motors of the motor-controller that any one of the motors $A^2$ and $A^{13}$ may be operated without actuating any of those following. In order to accomplish this result, I have divided the actuating-motors into sets, one set having one terminal of each motor permanently connected to ground, a second terminal permanently connected to the train-conductor 2, and the remaining terminals connected to one of the conductors 3 to 7, inclusive; another set also having one terminal of each motor permanently connected to ground, a second terminal permanently connected to train-conductor 3, and the remaining terminals connected to one of the conductors 4 to 7, inclusive, and a third set having one terminal of each motor permanently connected to ground, a second terminal permanently connected to train-conductor 7, and the remaining terminals connected to one of the conductors 4 to 6, inclusive. The new train-conductor O has been added solely for the purpose of separating the connections of the motor A' from the rest of the actuating-motors of the motor-controller, this being rendered necessary by the fact that since the motor A' actuates the contacts which close the circuit between the source and the motors it must be maintained in its operative position throughout all the operative positions of the master-controller.

The operation of the system shown in Fig. 3 is as follows: When the controlling-switch of the master-controller is moved into its first operative position, the motor A' is caused to close the contacts in the main motor-circuits at $a'$. In the second position of the master-controller the motor $A^2$ is actuated to close the corresponding contact device $a^2$. In the third position the motor $A^3$ is actuated to close its contact device, in the fourth position the motor $A^4$, and in the fifth position the motor $A^5$. Up to this point as each motor is actuated the connections of the preceding motors remain unchanged. As the master-controller is moved, however, from the fifth to the sixth position the motor $A^6$ is actuated and at the same time the connection to the motor $A^2$, through the train-conductor 3, is broken, so that the contact device actuated by this motor is returned to its off position. The connection to this motor is broken at this point of the movement of the master-controller for the reason that the next set of motors which are to be operated from these conductors have one of their terminals connected to the train-conductor 3 and their other free terminals connected to one of the conductors 4, 5, 6, and 7, whereas up to this point in the operation of the controller one of the terminals of the motors which have been actuated is connected to the train-conductor 2 and the other active terminal to one of the conductors 3, 4, 5, 6, and 7. As the master-controller is moved from the sixth to the seventh operative position all of the motors of the first set, with the exception of the motor $A^6$, are cut out of circuit and their corresponding contacts opened. When the master-controller reaches its seventh operative position, the motor $A^7$ is actuated, the motor $A^6$ maintaining its contacts in closed position until the motor $A^7$ has been actuated and then being cut out of circuit by reason of the fact that one of the contacts $c$ passes off from the corresponding fixed contact $2'$. In the eighth position of the master-controller the motor $A^7$ is maintained in its operative position and the motor $A^8$ is operated. In the ninth position the motors $A^7$ and $A^8$ are maintained in operative position and the motor $A^9$ is operated. In the tenth position the motor $A^{10}$ is operated and the motor $A^7$ cut out of circuit, and as the master-controller is moved from the tenth to the eleventh position the motors $A^8$ and $A^9$ are cut out of circuit and the motor $A^{11}$ actuated. In the twelfth position the motor $A^{10}$ is cut out of circuit by reason of the fact that one of the contacts $c$ passes from the corresponding fixed contact $3'$ and at the same time the motor $A^{12}$ is actuated, while in the last, the thirteenth, position of the main controlling-switch of the master-controller the motor $A^{13}$ is actuated and the motors $A^{11}$ and $A^{12}$ are maintained in their operative positions.

In the operation of the master-controller to make the connections above described it will be noted that when current is supplied to all the terminals of certain of the motors which it is desired shall be operated certain terminals of other motors which are not required to be operated are connected into circuit; but never more than two terminals are connected in, so that the motors which are required to remain in their inoperative positions are, if supplied with current at all, supplied with single-phase current flowing between two of the terminals of the motor, such current being, as is well understood, incapable of starting an ordinary induction-motor.

The construction of the several elements of the motor-controller B is shown in Figs. 4 to 7, inclusive. Figs. 4 and 5 indicate the construction of each one of the contact devices $a'$ to $a^{13}$, inclusive, together with its actuating-motor, and Figs. 6 and 7 indicate the construction of the contact device $A^{14}$, together with its actuating-motor. In Fig. 4 A indicates the motor by which the contact device is actuated, the said motor being secured in position beneath a suitable support, which may be the floor of the car, and having its shaft $s$ elongated and provided with an insulating-sleeve upon which are mounted two contacts $b$ and $e$, which, as the motor is actuated, are caused to revolve and come into contact with fingers $f$ to $f^3$, inclusive, the contact $d$ operating to close the circuit between the fingers $f$ and $f'$ and the contact device $e$ operating to close the circuit between the fingers $f^2$ and $f^3$, thus completing the circuit connections, (indicated at $a'$ to $a^{13}$, inclusive, in Fig. 3.) The contacts $d$ and $e$ are in the construction illustrated mounted upon weighted arms, so that they are returned to the off position by gravity only; but I may also employ returning-springs, or I may make use of springs alone. The contact devices are preferably provided with a suitable arc-extinguishing device, and in the embodiment illustrated in the drawings I have shown a receptacle D surrounding or inclosing the contacts and fingers and containing oil or other suitable insulating fluid. As shown in the drawings, this receptacle D is bolted to the structure beneath which the motor A is mounted and carries the bearings for the shaft $s$; but evidently these details of construction, as well as the form of the arc's extinguishing device, may be materially modified without departing from my invention, which requires merely that the controller shall comprise separate sets of contacts actuated by induction-motors. The construction illustrated in Figs. 6 and 7 is in general the same as that illustrated in Figs. 4 and 5; but the reversing-switch is provided with four contacts instead of two. Each of these contacts consists of a cylindrical portion $g$, provided with sector-shaped extensions $h$, as shown in Fig. 6, the sector-shaped extensions being arranged to contact with the fingers $f$ to $f^7$, inclusive, as the shaft $s$ is moved from its extreme right-hand to its extreme left-hand position, or vice versa. Of the contact-fingers $f$ to $f^7$, inclusive, on each side of the reversing-switch cylinder, $f$ to $f^3$, inclusive, are connected in the main circuit of the propelling-motors, while $f^4$ to $f^7$, inclusive, operate to make and break the connections between the source and the reversing-switch R S of the master-controller. With the switch in either of its operative positions—as, for example, in the position indicated in Fig. 6—if the reversing-switch of the master-controller is moved to its other extreme position the motor $A^{14}$ will be energized in such a manner as to cause the shaft $s$ to revolve left handedly and bring the sectors $h$ into contact with the set of fingers $f$ to $f^7$, inclusive, at the right and out of contact with the corresponding fingers at the left. The shaft and sectors are maintained in either of the two operative positions by means of springs $m$, the ends of which engage lugs $n$, carried by the shaft. The terminal connections $k$ and $k'$ are led from the contact-fingers to the outside of the receptacle D, so that the conductors may be conveniently attached thereto.

I have not deemed it necessary to illustrate any particular construction of the induction-motor A, since the motor may be of any ordinary type and may have a secondary member consisting of a solid iron core or the member may be provided with a closed winding. The motor is required to exert but little torque, since its entire load consists of the movable contacts carried by the motor-shaft, and it may therefore be made of very small size.

I have illustrated in the drawings a three-phase system only; but evidently my system may be operated from any multiphase source or even from a single-phase source if some means is provided for transforming the single-phase current into multiphase.

What I claim as new, and desire to secure by Letters Patent of the United States, is—

1. In a train-control system, an induction-motor equipment on one or more cars of the train, regulating resistances on each motor-car arranged to be included in circuit with the induced members of the motors on the said car, and means controlled from any desired point on the train for varying the resistance in circuit with said induced members.

2. In a train-control system, an induction-motor equipment on one or more cars of the train, regulating resistances on each motor-car arranged to be included in circuit with the induced members of the motors on said car, a motor-controller on each motor-car, actuating means for said controllers, and a master-controller located at any desired point on the train, for controlling said actuating means.

3. In a train-control system, an induction-motor equipment on one or more cars of the train, regulating resistances for the motors located on each motor-car, a separate controller for the resistances on each car, and a master-controller, located at a desired point on the train, for controlling the operation of all the resistance-controllers on the train.

4. In a train-control system, an induction-motor equipment on one or more cars of the train, a resistance-controller for each of said equipments, means for actuating each of said resistance-controllers, and a master-controller, located at any desired point on the train, for controlling the operation of said actuating means.

5. In a train-control system, a plurality of cars equipped with induction-motors, resistances on each of said cars arranged to be included in circuit with the induced members of said motors, controllers for said resistances, actuating means for said controllers constructed and arranged to be operated from an alternating-current source, and a master-controller, located at any desired point on the train, for controlling the connections between a source of alternating-current supply and the said actuating means.

6. In a system of motor control, a controller comprising a plurality of separately-actuated contact devices and an actuating device for each of said contact devices comprising an induced member operatively connected to the contact device and an inducing member arranged to be supplied with current from an alternating-current source.

7. In a system of motor control, a controller comprising a plurality of separately-actuated contact devices, and an induction-motor operatively connected to each of said contact devices.

8. In a system of motor control, a controller comprising a plurality of separately-actuated contact devices, an induction-motor for operating each of said contact devices, a source of alternating current, and a master-controller constructed and arranged to connect the inducing member of each of said motors to said source.

9. In combination, a controller comprising a plurality of separately-actuated contact devices, an induction-motor operatively connected to each of said contact devices, a source of alternating current, and a master-controller for controlling the connection between said motors and said source.

10. In a motor-control system, a controller comprising separately-actuated contact devices, multiphase motors for actuating said contact devices, a source of multiphase current, common connections between certain of the terminals of each motor and the source, separate connections between the remaining motor-terminals and said source, and a master-controller for controlling the latter connections.

11. In a motor-control system, a plurality of conductors, controller-actuating devices connected to said conductors, a separate device for actuating the reversing-switch connected to the same conductors, and means whereby the main controlling-contacts may be operated without effecting the operation of the reversing-switch contacts and vice versa.

12. In a motor-control system, a plurality of conductors, controller-actuating means connected to said conductors, a separate means for actuating the reversing-switch connected to certain of said conductors, means for closing a circuit from the source of supply to the conductors to which the reversing-switch-actuating means is connected, and means operated by the reversing-switch for opening said circuit.

13. In a motor-control system, a plurality of conductors, controller-actuating means connected to said conductors, a separate means for actuating the reversing-switch connected to the same conductors, a master-controller comprising a controlling and a reversing switch interposed between the source of supply and the said conductors, and means operated by the motor-reversing switch for opening the circuit between the master-reversing switch and the system of conductors.

14. In a motor-control system, a system of conductors, actuating devices for the main controller-contacts connected to said conductors, and an actuating device for the reversing-switch contacts connected to certain of the conductors to which the other actuating devices are connected.

15. In a train-control system, a motor-controller comprising separately-actuated contact devices, multiphase motors for actuating said contact devices, a source of multiphase current, common connections between certain of the terminals of each motor and the source, a system of train-conductors less in number than the number of motors to which the remaining terminals are connected and a master-controller arranged to successively connect the multiphase motors to the source.

16. In a train-control system, a motor-controller comprising separately-actuated contact devices, a multiphase motor for actuating each of said devices, said motors being connected in a plurality of sets to a system of train-conductors less in number than the number of motors, a source of multiphase current, and a master-controller interposed between said system of conductors and said source, and arranged to supply current to actuate the motors of one set without causing the operation of any of the motors in the other sets.

17. In a train-control system, reversing-switch contacts on each of the motor-cars of the train, actuating devices for said contacts, train-conductors to which said actuating devices are connected, a master-reversing switch connected to supply current from a suitable source to said conductors, and auxiliary contacts actuated by one of the reversing-switches for opening the circuit between the master-reversing switch and the train-conductors.

In witness whereof I have hereunto set my hand this 5th day of October, 1900.

ALBERT H. ARMSTRONG.

Witnesses:
BENJAMIN B. HULL,
MARGARET E. WOOLLEY.